US012800035B2

(12) United States Patent
Bradley

(10) Patent No.: US 12,800,035 B2
(45) Date of Patent: Nov. 17, 2026

(54) SLIDE GATE ASSEMBLY

(71) Applicant: Mueller International, LLC, Atlanta, GA (US)

(72) Inventor: Jason White Bradley, Soddy Daisy, TN (US)

(73) Assignee: Mueller International, LLC, Atlanta, GA (US)

( * ) Notice: Subject to any disclaimer, the term of this patent is extended or adjusted under 35 U.S.C. 154(b) by 264 days.

(21) Appl. No.: 18/643,652

(22) Filed: Apr. 23, 2024

(65) Prior Publication Data

US 2024/0271707 A1 Aug. 15, 2024

Related U.S. Application Data

(62) Division of application No. 17/588,962, filed on Jan. 31, 2022, now Pat. No. 11,994,228.

(51) Int. Cl.
*F16K 3/316* (2006.01)
*F16K 3/02* (2006.01)
*F16K 27/04* (2006.01)

(52) U.S. Cl.
CPC ............ *F16K 3/316* (2013.01); *F16K 3/0236* (2013.01); *F16K 3/0263* (2013.01); *F16K 27/044* (2013.01)

(58) Field of Classification Search
CPC ..... E02B 7/54; E02B 7/26; E02B 7/28; F16K 27/04; F16K 27/044; B23K 11/0013; B23K 10/027; B23K 26/342
See application file for complete search history.

(56) References Cited

U.S. PATENT DOCUMENTS

| | | | | |
|---|---|---|---|---|
| 786,043 | A | 3/1905 | Luckett | |
| 983,297 | A | 2/1911 | Leopold | |
| 1,704,955 | A | 3/1929 | Snow | |
| 1,732,241 | A * | 10/1929 | Murray, Jr. | F16K 3/12 29/890.129 |
| 4,028,896 | A | 6/1977 | Whipps | |
| 4,070,863 | A * | 1/1978 | Brown | E02B 7/54 405/105 |
| 5,947,443 | A | 9/1999 | Shellenbarger et al. | |
| 10,378,656 | B2 | 8/2019 | Abouelleil | |

(Continued)

OTHER PUBLICATIONS

Anonymous. Seminar Report: Anatomy of a Sluice Gate. Rodneyhunt.com [online], Mar. 2006 [retrieved on Mar. 23, 2026]. Retrieved from the Internet:<URL: https://web.archive.org/web/20060320073952/http://www.rodneyhunt.com/Anatomy_sluicegate.pdf> (Year: 2006).*

(Continued)

*Primary Examiner* — Jacob J Cigna
(74) *Attorney, Agent, or Firm* — Smith, Gambrell & Russell, LLP

(57) ABSTRACT

A slide gate assembly is disclosed, comprising a gate frame with an integral frame seal and a slide gate slidably mounted on the gate frame. The gate frame includes a frame opening, a frame support structure, and the integral frame seal with a frame seating face. The slide gate consists of a gate body and an integral gate seal with a gate seating face that seals and slides along the frame seating face. The slide gate is movable between an open orientation, allowing fluid flow through the frame opening, and a closed orientation, restricting fluid flow through the frame opening.

12 Claims, 9 Drawing Sheets

(56) References Cited

U.S. PATENT DOCUMENTS

| | | | | |
|---|---|---|---|---|
| 10,808,850 | B2 | 10/2020 | Abouelleil et al. | |
| 10,866,576 | B2 * | 12/2020 | Jacobs | B33Y 40/20 |
| 11,007,704 | B2 | 5/2021 | Lowinger et al. | |
| 11,994,228 | B2 | 5/2024 | Bradley | |
| 12,578,023 | B2 | 3/2026 | Bradley | |
| 2004/0107019 | A1 * | 6/2004 | Keshavmurthy | G05B 19/4097 700/118 |
| 2018/0216738 | A1 | 8/2018 | Gabriel et al. | |
| 2018/0236555 | A1 | 8/2018 | Weinenger | |
| 2018/0272472 | A1 | 9/2018 | Aoyama et al. | |
| 2023/0091259 | A1 | 3/2023 | Marya et al. | |
| 2023/0243431 | A1 | 8/2023 | Bradley | |
| 2024/0271708 | A1 | 8/2024 | Bradley | |
| 2025/0290567 | A1 | 9/2025 | Bradley | |

OTHER PUBLICATIONS

Alanerickson. 4" slide gate valve. Thingiverse.com [online], Apr. 2017 [retrieved Mar. 23, 2026]. Retrieved from the internet. <URL: https://www.thingiverse.com/thing:2237898> (Year: 2017).*

Bradley, Jason White; Non-Final Office Action for U.S. Appl. No. 18/643,680, filed Apr. 23, 2024, mailed May 20, 2025, 25 pgs.

Bradley, Jason White; Non-Final Office Action for U.S. Appl. No. 18/608,611, filed Mar. 18, 2024, mailed May 20, 2025, 26 pgs.

Bradley, Jason White; Notice of Allowance for U.S. Appl. No. 18/643,680, filed Apr. 23, 2024, mailed Dec. 16, 2025, 12 pgs.

Bradley, Jason White; Final Office Action for U.S. Appl. No. 18/608,611, filed Mar. 18, 2024, mailed Nov. 24, 2025, 17 pgs.

Bradley, Jason White; Non-Final Office Action for U.S. Appl. No. 17/588,962, filed Jan. 31, 2022, mailed Oct. 18, 2023, 12 pgs.

Bradley, Jason White; Notice of Allowance for U.S. Appl. No. 17/588,962, filed Jan. 31, 2022, mailed Jan. 24, 2024, 7 pgs.

Bradley, Jason White; Requirement for Restriction/Election for U.S. Appl. No. 17/588,962, filed Jan. 31, 2022, mailed Sep. 7, 2023, 7 pgs.

Mueller; Brochure for Heavy Duty HG560—Cast Iron Slide Gate, publicly available prior to Jan. 31, 2022, 28 pgs.

Bradley, Jason White; Advisory Action for U.S. Appl. No. 18/608,611, filed Mar. 18, 2024, mailed Mar. 3, 2026, 3 pgs.

Bradley, Jason White; Notice of Allowance for U.S. Appl. No. 18/608,611, filed Mar. 18, 2024, mailed Apr. 13, 2026, 22 pgs.

* cited by examiner

SLIDE GATE ASSEMBLY

REFERENCE TO RELATED APPLICATIONS

This application is a divisional of U.S. application Ser. No. 17/588,962, filed Jan. 31, 2022, which is hereby specifically incorporated by reference herein in its entirety.

TECHNICAL FIELD

This disclosure relates to water flow control. More specifically, this disclosure relates to a slide gate assembly comprising an integral seal.

BACKGROUND

Slide gates are configured to control the flow of fluid through an opening in various applications, including dams, water and sewage treatment plants, flood control projects, power plants, fish hatcheries, and the like. Slide gate assemblies typically comprise a slide gate that is slidable relative to a gate frame. The slide gate can be sealed with the gate frame to prevent leakage therebetween. Often, the gate frame defines a frame seating face, and the slide gate comprises a strip of material cold formed into a groove of the slide gate and defining a gate seating face. The gate seating face can slidably engage the frame seating face to seal the slide gate with the gate frame and to allow the slide gate to slide between open and closed orientations.

However, cold forming the strip of material into the groove of the slide gate (e.g., by hammering) is a labor-intensive process, and can be both costly and time-consuming. Additionally, the seal between the slide gate and the gate frame can fail if the strip of material becomes dislodged from the groove. In such an event, repairing the gate frame and restoring the seal can be extremely costly and complex.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a slide gate assembly including: a gate frame defining a frame opening, a frame support structure, and an integral frame seal integrally formed with the frame support structure, the integral frame seal defining a frame seating face; and a slide gate slidably mounted on the gate frame, the slide gate including a gate body and an integral gate seal integrally formed with the gate body, the integral gate seal defining a gate seating face, the gate seating face sealed with and slidable along the frame seating face; wherein the slide gate is movable between an open orientation, wherein fluid is permitted to flow through the frame opening, and a closed orientation, wherein fluid is restricted from flowing through the frame opening.

Disclosed is a slide gate assembly, including: a gate frame including: a frame opening; a frame support structure; and a frame seal integrally formed with the frame support structure and defining a frame seating face; and a slide gate mounted on the gate frame and slidable between an open orientation and a closed orientation, the slide gate including: a gate body; and a gate seal integrally formed with the gate body, the gate seal defining a gate seating face slidably sealed with the frame seating face.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
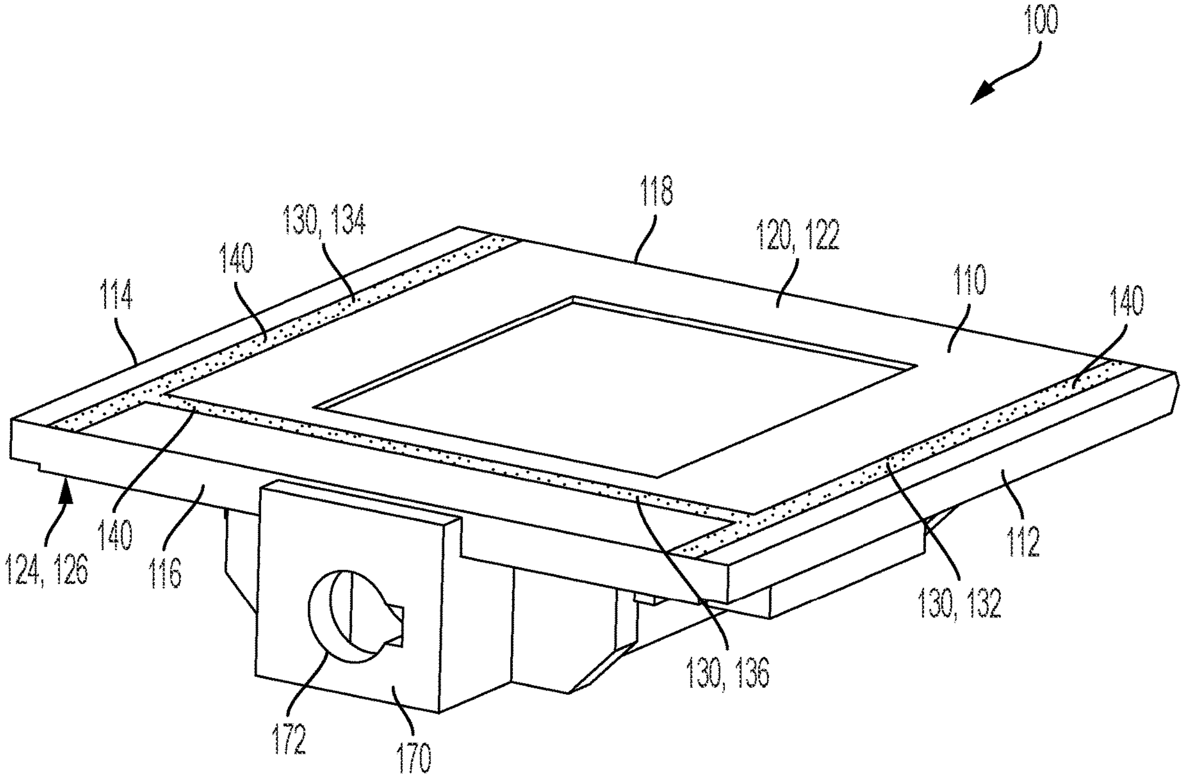
FIG. 1 is a top, rear perspective view of a slide gate, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a slide gate assembly and associated methods, systems, devices, and various apparatus. Example aspects of the slide gate assembly can comprise a gate frame and a gate body configured to slide relative to the gate frame. One or both of the gate frame and the gate body can comprise an integral seal. It would be understood by one of skill in the art that the slide gate assembly is described in but a few exemplary embodiments among many. No particular terminology or description should be considered limiting on the disclosure or the scope of any claims issuing therefrom.

FIG. 1 is a rear perspective view of a slide gate 100, in accordance with one aspect of the present disclosure. The slide gate 100 can be mounted to a gate frame 500 (shown in FIG. 5) and can be used to control the flow of fluid through a frame opening 564 (shown in FIG. 5) in various applications, including, but not limited to, dams, water and sewage treatment plants, flood control projects, power plants, fish hatcheries, and the like. As shown, the slide gate 100 can define a gate body 110. The gate body 110 can define a first gate face 120, which can be an inward-facing gate face 122, and an opposite second gate face 124, which can be an outward-facing gate face 126. The gate body 110 can define a substantially square or rectangular shape in some aspects. The gate body 110 can further define a first lateral side 112, a second lateral side 114 opposite the first lateral side 112, an upper end 116, and a lower end 118 opposite the upper end 116. In the present aspect, the first gate face 120 of the gate body 110 can be substantially planar, as shown. Example aspects of the gate body 110 can be formed from a metal material, such as, for example, iron, and more specifically, cast iron. For example, the gate body 110 of the slide gate 100 may be cast from grey iron or ductile iron in some aspects. However, in other aspects, the gate body 110 can comprise any other suitable material known in the art, including but not limited to, other metal materials, such as aluminum and steel, plastic materials, composite materials, and the like.

Figure 7:
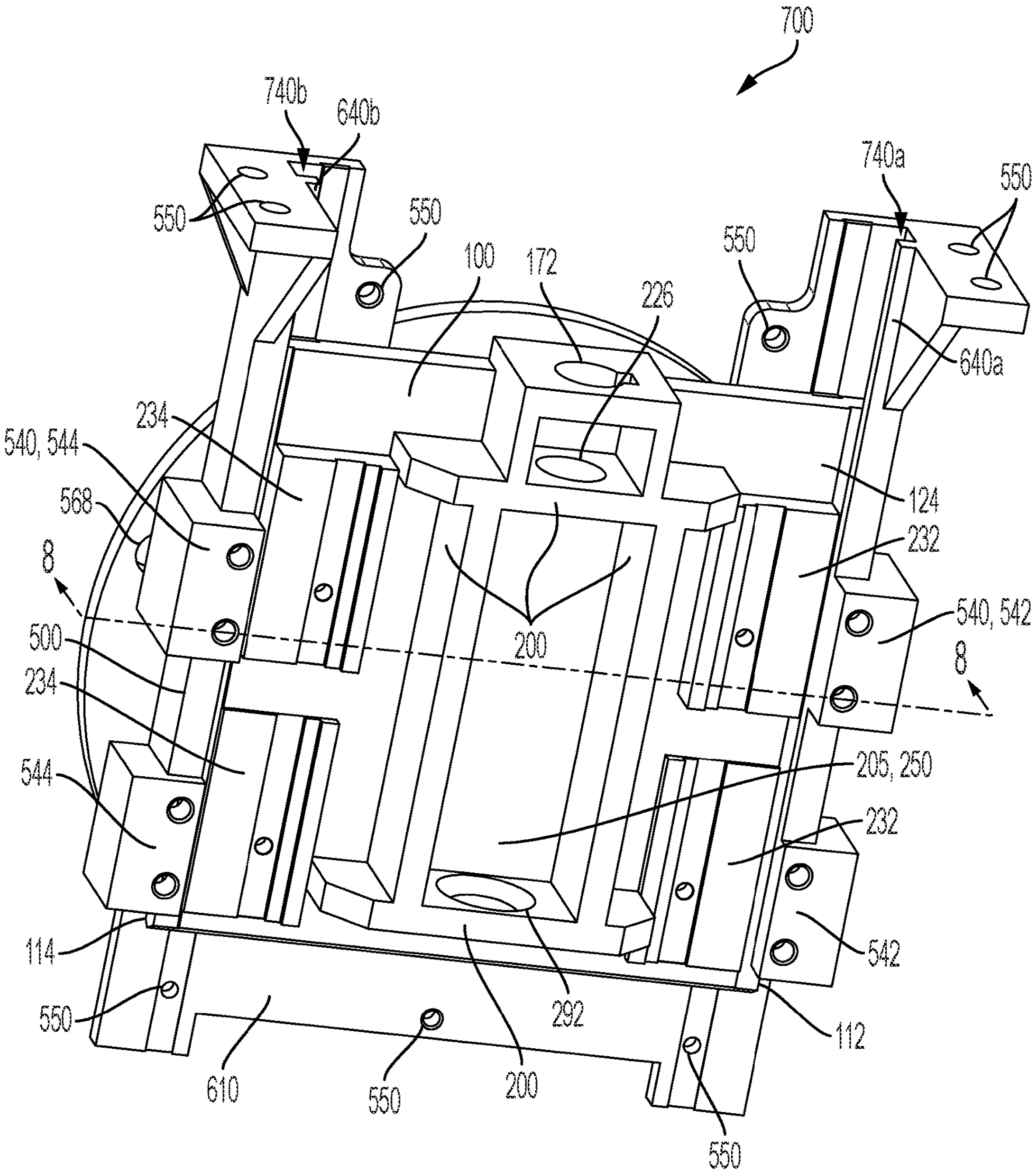
FIG. 7 is a front perspective view of a slide gate assembly comprising the slide gate of FIG. 4 and the gate frame of FIG. 5, wherein the slide gate is in a closed orientation.

As shown, according to example aspects, the gate body 110 can define an upper stem block 170 at the upper end 116 thereof. The upper stem block 170 can be substantially centered at the upper end 116. Example aspects of the upper stem block 170 can define an upper stem opening 172, configured to receive an operating stem (not shown) therethrough. The operating stem can be configured to lower and raise the slide gate 100 relative to the gate frame 500 between a closed orientation, as shown in FIG. 7, and an open orientation. In the closed orientation, the gate body 110 can block the frame opening 564 to restrict fluid from flowing through the frame opening 564. In the open orientation, the gate body 110 can partially or fully unblock the frame opening 564 to permit fluid to flow through the frame opening 564. The operating stem can be manually driven, electronically driven, or driven by any other suitable driving means known in the art. The upper stem block 170 can be cast monolithically (i.e., formed a singular component that constitutes a single material without joints or seams) with the gate body 110, as shown, or can be formed separately and attached thereto.

In example aspects, the first gate face 120 of the gate body 110 can define a plurality of textured or gate rough regions 130. For example, the gate rough regions 130 can comprise elongated first and second gate rough regions 132,134 and a lateral gate rough region 136 extending therebetween. Each of the first and second gate rough regions 132,134 can be defined proximate to a corresponding one of the first and second lateral sides 112, 114, and the first and second gate rough regions 132, 134 can be substantially parallel with one another. As shown, each of the first and second gate rough regions 132,134 can extend substantially from the upper end 116 of the gate body 110 to the lower end 118 of the gate body 110. The first gate face 120 can further define the lateral gate rough region 136 extending laterally between the first and second gate rough regions 132, 134. In the present aspect, the lateral gate rough region 136 can be defined proximate to the upper end 116 of the gate body 110. The gate rough regions 130 can be formed at target locations 140 where an additive material 310 (shown in FIG. 3B), such as a a metal powder, for example and without limitation, is to be deposited onto the first gate face 120 to form a gate seal 320 (shown in FIG. 3C) that is integral with the gate body 110 (i.e., the gate seal 320 and the gate body 110 can be permanently affixed together to make up a single complete piece, so as to be incapable of being easily dismantled without destroying the integrity of the piece). In example aspects, the metal powder can be a bronze powder. According to example aspects, the gate rough regions 130 can create an improved sealing surface for adhering the additive material 310 to the first gate face 120. The additive material 310 can be deposited on the gate body 110 by additive manufacturing. Additive manufacturing is beneficial in that it provides a permanent attachment of the integral gate seal 320 to the gate body 110, which eliminates the possibility of the integral gate seal 320 detaching from the gate body 110 and the associated costly repairs. In other aspects, the additive material can be other suitable material known in the art, including metal materials, such as nickel or steel, and non-metal materials.

The gate rough regions 130 can be formed by scuffing, scratching, cutting, or otherwise roughing up the first gate face 120 at the target locations 140 so that the gate rough regions 130 can be generally rough relative to the surrounding portions of the first gate face 120. For example, in some aspects, a cutting tool can be utilized by a CNC machine to scratch the gate rough regions 130 onto the first gate face 120. Furthermore, in the example aspects, the integral gate seal 320 can be deposited onto the gate body 110 and then precision-machined to the desired shape and size by the process of hybrid manufacturing. In hybrid manufacturing, both additive manufacturing (i.e., depositing the additive material 310 on the gate body 110 to form the integral gate seal 320) and subtractive manufacturing (i.e., precision-machining the integral gate seal 320) can be performed by the same machine. Hybrid manufacturing has many benefits, including by not limited to, reduced manufacturing time, reduced labor, and reduced material waste. In the present aspect, the integral gate seal 320 can be deposited and precision machined by an additive head and a cutting tool, respectively, both operated by a singular CNC machine. According to example aspects, the gate rough regions 130 can be formed and the integral gate seal 320 can be deposited and machined all by the same machine. Other aspects of the gate body 110 can define more or fewer gate rough regions 130 and/or the gate rough regions 130 can be alternatively arranged on the first gate face 120. Other aspects of the gate body 110 may not define the gate rough regions 130, and the integral gate seal 320 can be deposited directly onto a substantially smooth first gate face 120 of the gate body 110.

Figure 2:
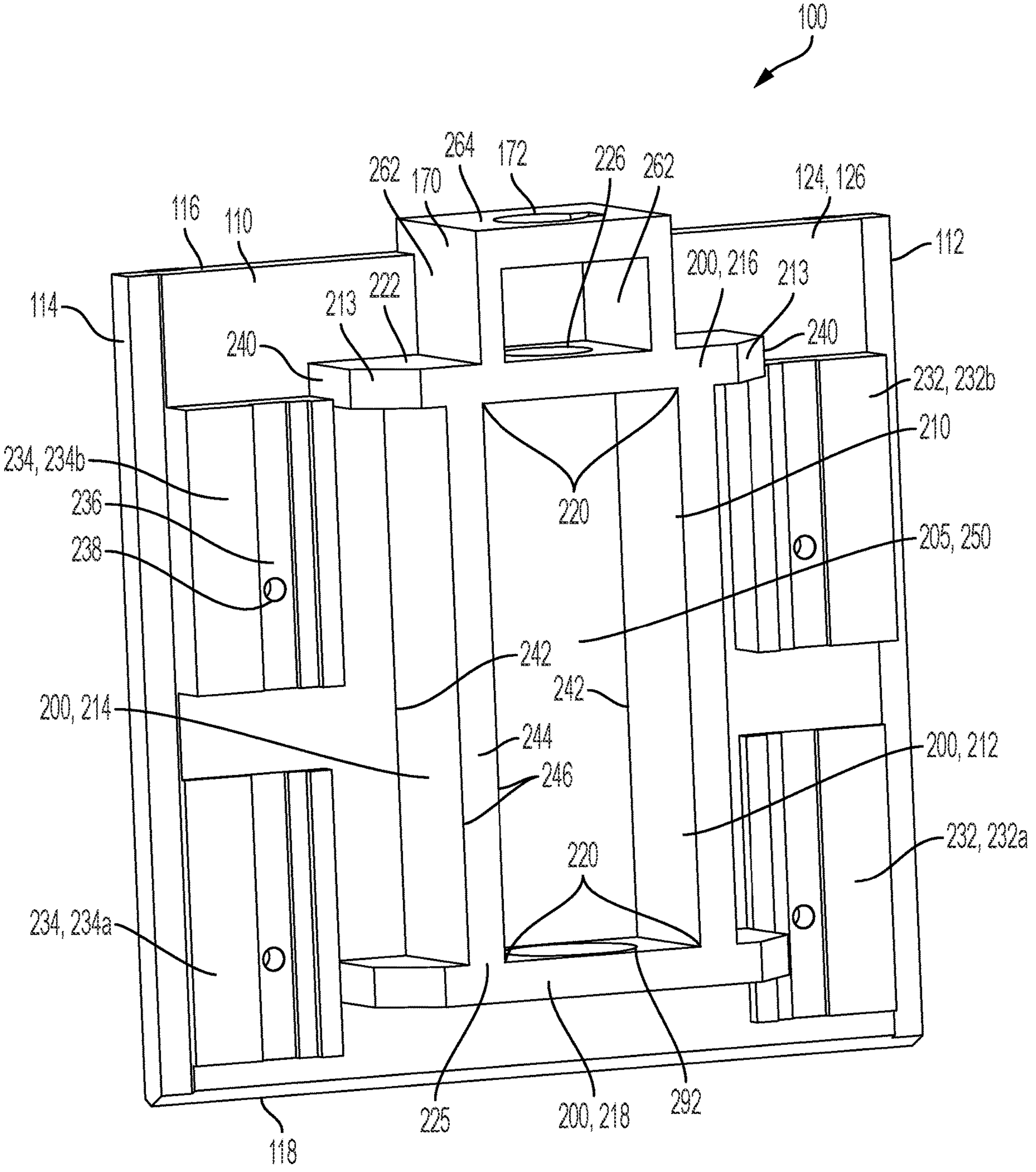
FIG. 2 is a front perspective view of the slide gate of FIG. 1.

FIG. 2 illustrates a front perspective view of the slide gate 100, showing the second gate face 124 thereof. According to example aspects, a plurality of reinforcement ribs 200 can extend from the second gate face 124 of the slide gate 100. The reinforcement ribs 200 can be cast monolithically with the gate body 110 in the present aspect; however, in other aspects, the reinforcement ribs 200 may be formed separately and attached to the second gate face 124. Each of the reinforcement ribs 200 can extend from the second gate face 124 in a direction that can be about perpendicular to the second gate face 124, as shown; although, in other aspects, the reinforcement ribs 200 may not be perpendicular to the second gate face 124. The reinforcement ribs 200 can be configured to provide reinforcement to the gate body 110 of the slide gate 100. For example, in use, fluid, such as water, can apply pressure to the first gate face 120 of the gate body 110, and the reinforcement ribs 200 can serve to disperse the pressure across the gate body 110 and to minimize and/or locate deflection of the gate body 110, as needed.

In the present aspect, the reinforcement ribs 200 can define a substantially rectangular rib frame 210. In other aspects, the rib frame 210 can define a substantially square shape, circular shape, or any other suitable shape. The rib frame 210 can substantially enclose a center area 205 of the gate body 110, as shown. According to example aspects, the reinforcement ribs 200 can comprise a substantially vertical first side rib 212 oriented proximate to the first lateral side 112 of the gate body 110 and a substantially vertical second side rib 214 oriented proximate to the second lateral side 114 of the gate body 110. The first and second side ribs 212,214 can be oriented substantially parallel to one another. The reinforcement ribs 200 can further comprise a substantially horizontal upper end rib 216 oriented proximate to the upper end 116 of the gate body 110 and a substantially horizontal lower end rib 218 oriented proximate to the lower end 118 of the gate body 110. Each of the first and second side ribs 212,214 and can be connected to the upper and lower end ribs 216,218 at adjacent ends thereof to define four corners 220 of the exterior rib frame 210. Each of the four corners 220 can define a three-way junction 225, as shown. Three-way junctions 225 can have the benefit of being less prone to casting defects as compared to, for example, four-way junctions, five-way junctions, etc. Other aspects of the rib frame 210 can define more or fewer reinforcement ribs 200 as needed, dependent upon a variety of factors, including, but not limited to, the size of the slide gate 100 and/or the amount of pressure applied thereto.

In the present aspect, each of the first and second side ribs 212,214 can define a length that can be greater than a length of each of the upper and lower end ribs 216,218 to define the substantially rectangular shape of the rib frame 210. In some aspects, each of the upper and lower end ribs 216,218 can define opposing ends 240 that extend beyond the first and second side ribs 212,214 towards the corresponding first and second lateral sides 112,114. Each of the upper and lower end ribs 216,218 can define a chamfered portion 213 at each of the opposing ends 240, as shown. In other aspects, however, the upper and lower end ribs 216,218 may not extend beyond the first and second side ribs 212,214 and/or the opposing ends 240 of the upper and lower end ribs 216,218 may not define the chamfered portions 213. According to example aspects, a height of the rib frame 210 extending away from the second gate face 124 can be substantially uniform, except for at the chamfered portions 213. Additionally, each of the first and second side ribs 212,214 and the upper and lower end ribs 216,218 can be substantially equal in width. In other aspects, the dimensions of the first and second side ribs 212,214, the upper and lower end ribs 216,218, and/or the rib frame 210 overall can vary.

In example aspects, each of the reinforcement ribs 200 can meet the second gate surface of the gate body 110 at substantially sharp inner edges 242, as shown. In other aspects, the inner edges 242 formed between the reinforcement ribs 200 and the second gate surface can be chamfered or filleted. Each of the reinforcement ribs 200 can further define a distal rib face 244 distal to the second gate face 124. In the present aspect, the distal rib faces 244 can be substantially planar and can define substantially sharp outer edges 246 of the reinforcement ribs 200. However, in other aspects, the reinforcement ribs 200 can be chamfered or filleted at the outer edges 246. Furthermore, an unreinforced space 250 of the gate body 110 can be enclosed within the rib frame 210 at the center area 205 of the gate body 110, which can allow the stem to extend between the upper end rib 216 and the lower end rib 218 without obstruction, as described below.

According to example aspects, fluid pressure on the gate body 110 in the closed orientation can exert stresses (e.g., bending moments) on the gate body 110 and can cause the gate body 110 to deflect. Providing the rib frame 210 can serve to reinforce the gate body 110 to reduce deflection of the gate body 110 under pressure. It can be particularly beneficial to reduce the deflection of the gate body 110 at and around first side wedge pads 232 and second side wedge pads 234, which are located proximate to the first lateral side 112 and second lateral side 114, respectively, as described in further detail below. While portions of the gate body 110 that are reinforced by the rib frame 210 (i.e., reinforced space) can undergo minimal deflection, the gate body 110 can deflect more at the unreinforced space 250 defined within the rib frame 210. According to some example aspects, the size of the unreinforced space 250 can determine the amount of deflection allowed at the unreinforced space 250.

According to example aspects, the upper stem block 170 can be connected to the upper end rib 216, as shown. Specifically, in the present aspect, the upper stem block 170 can comprise a pair of substantially vertical block sidewalls 262 extending generally upward from an outer rib surface 222 of the upper end rib 216, relative to the orientation shown. The upper stem block 170 can further define a substantially horizontal upper block wall 264 extending between the block sidewalls 262, distal to the upper end rib 216. The upper stem opening 172 can be formed through the upper block wall 264. In other aspects, the upper stem block 170 can define any other suitable shape or configuration. Furthermore, an upper rib stem opening 226 can be formed through the upper end rib 216, and can be aligned with the upper stem opening 172, as shown. Furthermore, a lower rib stem opening 292 can be formed through the lower end rib 218 and can be substantially aligned with the upper stem opening 172 and the upper rib stem opening 226, such that the operating stem can extend through each of the upper stem opening 172, the upper rib stem opening 226, and the lower rib stem opening 292. In some aspects, the operating stem can define external threading configured to matingly engage internal threading formed in each of the upper stem opening 172, the upper rib stem opening 226, and the lower rib stem opening 292.

Example aspects of the slide gate 100 can further comprise one or more of the first side wedge pads 232 and one or more of the second side wedge pads 234. As shown, in the present aspect, the slide gate 100 can comprise two of the first side wedge pads 232 coupled to the second gate face 124 of the slide gate 100 proximate to the first lateral side 112 of the gate body 110 and two of the second side wedge pads 234 coupled to the second gate face 124 proximate to the second lateral side 114 of the gate body 110. The first side wedge pads 232 and/or the second side wedge pads 234 can be cast monolithically with the gate body 110 or can be formed separately and attached thereto. Other aspects can comprise more or fewer first side wedge pads 232 and/or second side wedge pads 234, as needed.

Each of the first side wedge pads 232 and second side wedge pads 234 can be vertically spaced along the second gate face 124, as shown. In the present aspect, each of the first side wedge pads 232 can be oriented between the first lateral side 112 of the gate body 110 and the first side rib 212, and each of the second side wedge pads 234 can be oriented between the second lateral side 114 of the gate body 110 and the second side rib 214. According to example aspects, a lower wedge pad **232*a*,234*a* of each of the first and second side wedge pads 232,234, respectively, can define a height extending away from the first gate face 120 that can be less than a height of an upper wedge pad 232*b*,234*b* of the corresponding first and second side wedge pads 232,234, respectively. The heights of the lower wedge pads 232*a*,234*a* and the upper wedge pads 232*b*,234*b* can be staggered to prevent interference with corresponding frame wedge blocks 540 (shown in FIG. 5) of the gate frame 500 (shown in FIG. 5) as the slide gate 100 moves between the closed and open orientations. In example aspects, the first side wedge pads 232 and the second side wedge pads 234 can provide added reinforcement to the slide gate 100 proximate to the first and second lateral ends 112,114**, respectively.

In example aspects, as shown, each of the first and second side wedge pads 232,234 can define a substantially vertical slot 236 extending across a length thereof. Each first and second side wedge pad 232,234 can further define a wedge pad fastener hole 238 formed therethrough at the corresponding vertical slot 236, wherein the wedge pad fastener hole 238 can be configured to receive a wedge fastener (not shown) for mounting a gate wedge (not shown) to each of the first and second side wedge pads 232,234. Each of the gate wedges can define a gate wedge face (not shown) configured to abut a frame wedge face (not shown) of a frame wedge mounted to the corresponding frame wedge block 540 of the gate frame 500. According to some example aspects, the gate wedge faces of gate wedges and the frame wedge faces of the frame wedges can comprise a bronze material. In other aspects, the gate wedge faces and frame wedge faces can define any other suitable material known in the art. It is often desirable to prevent deflection of the gate wedge faces and frame wedge faces, and the reinforcement ribs 200 can provide the desired reinforcement at or near the corresponding first and second lateral sides 112, 114 of the gate body 110 where the side wedge pads 232,234 are located. In particular, as described above, the reinforcement ribs 200 of the rib frame 210 can aid in minimizing deflection at outer edges of the gate body 110, while the unreinforced space 250 can allow for deflection to occur at and around the center area 205 of the gate body 110.

Figure 3C:
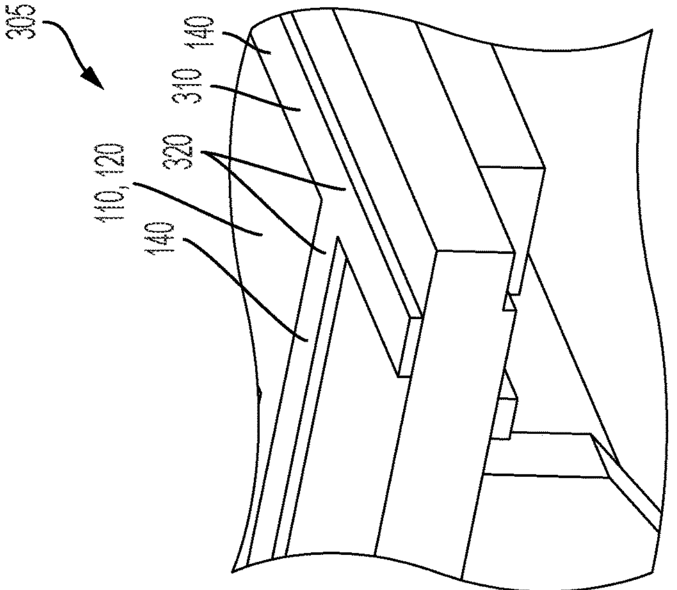
FIG. 3C is a detail view of the upper corner of FIG. 3A, illustrating the gate seal integrally formed with the slide gate.
Figure 3B:
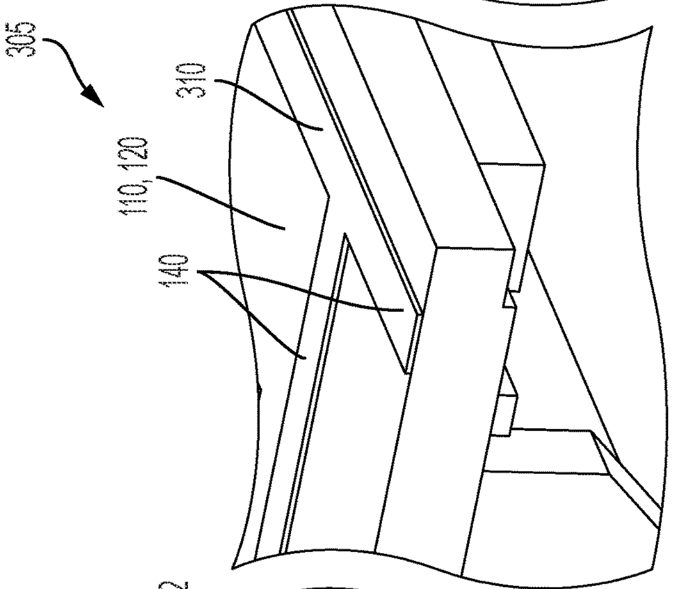
FIG. 3B is a detail view of the upper corner of FIG. 3A, illustrating a second step in integrally forming the gate seal with the slide gate.
Figure 3A:
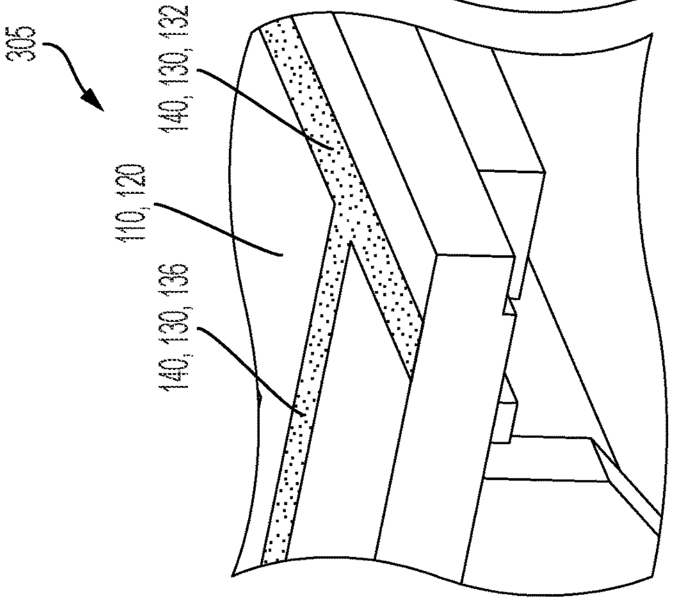
FIG. 3A is a detail view of an upper corner of the slide gate of FIG. 1, illustrating a first step in integrally forming a gate seal with the slide gate.

FIGS. 3A-3C illustrate the process of depositing the additive material 310 (shown in FIG. 3B) onto the gate rough regions 130 (shown in FIG. 3A) of the first gate face 120 (shown in FIG. 3A) of the gate body 110 to form the integral gate seal 320 (shown in FIG. 3C) therewith. As described above, the additive material 310 can be deposited onto the first gate face 120 by additive manufacturing. In example aspects, the additive material 310 can be a metal powder, such as a bronze powder, for example and without limitation. In other aspects, the additive material 310 can be any other suitable material known in the art.

FIG. 3A illustrates a close-up view of an upper corner 305 of the first gate face 120 of the gate body 110. According to example aspects, the first gate face 120 can define the textured or gate rough regions 130 formed thereon. In the present view, the intersection of the elongated first gate rough region 132 and the lateral gate rough region 136 is shown. The gate rough regions 130 can be formed on the first gate face 120 by scuffing, scratching, or otherwise roughing up the first gate face 120 at the target locations 140. In the present aspect, a cutting tool can be picked up and operated by a CNC machine to scratch the gate rough regions 130 onto the first gate face 120. In example aspects, the gate rough regions 130 can create an improved sealing surface on the first gate face 120 for adhering the additive material 310 (shown in FIG. 3B) thereto. Other aspects may not comprise or require the gate rough regions 130, and the additive material 310 can be deposited directly onto a substantially smooth area of the first gate face 120.

FIG. 3B illustrates the first gate face 120 of the gate body 110 part-way through the additive manufacturing process. According to example aspects, the additive material 310 (e.g., the bronze powder) that forms the integral gate seal 320 (shown in FIG. 3C) can be deposited in layers on the gate rough regions 130 (shown in FIG. 3A) at the target locations 140 to incrementally build up the integral gate seal 320 on the first gate face 120. Forming the integral gate seal 320 by the process of additive manufacturing can result in the integral gate seal 320 being integrally formed with, and permanently attached to, the gate body 110. The additive material 310 can be deposited by the additive head by plasma arc additive manufacturing, laser additive manufacturing, cold spray additive manufacturing, or any other suitable additive manufacturing process known in the art. Plasma arc additive manufacturing utilizes heated gas expelled through a plasma torch to melt the additive material 310 (the bronze powder or a bronze wire, for example), and the melted additive material 310 can be applied to the first gate face 120 in layers. Similarly, laser additive manufacturing utilizes a laser to heat and melt the additive material 310, and the melted additive material 310 can be applied in layers. In cold spray manufacturing, a powdered additive material 310 (e.g., the bronze powder) is accelerated in a high-velocity compressed gas stream. The particles of the additive material 310 can deform and bond together to create a layer upon impact with the first gate face 120. Additional layers of the additive material 310 can then be added. In example aspects, the additive material 310 can be deposited on the first gate face 120 by an additive head of the same CNC machine used to form the gate rough regions 130.

In some aspects, the additive manufacturing process can utilize a Powder Bed Fusion (PBF) technique. Examples of Powder Bed Fusion techniques include selective laser sintering (SLS), direct metal laser sintering (DMLS), selective laser melting (SLM), multi jet fusion (MJF), and electron-beam additive manufacturing (also known as electron-beam melting, or EBM), for example and without limitation. Selective laser sintering can include both metals and polymers, while direct metal laser sintering can be utilized for metals. Both selective laser sintering and direct metal laser sintering can use a laser as the power source to sinter powdered material and bind the material together to create a solid structure Selective laser melting can melt the powder using a high-energy laser to create fully dense materials in a layer-wise method. Electron-beam melting can melt metal powder layer by layer with an electron beam in a high vacuum. Multi jet fusion is a powder-based technique that applies fusing and detailing agents which are then combined by heating to create a solid layer.

FIG. 3C illustrates the first gate face 120 of the gate body 110 after the additive manufacturing process has been completed and the additive material 310 is fully deposited onto the first gate face 120 at the target locations 140 to form the integral gate seal 320. Once the additive manufacturing process is completed, the gate seal 320 can then be machined to the desired shape and size by the subtractive manufacturing process. In hybrid manufacturing, the subtractive manufacturing can be performed by the same machine (such as the CNC machine) that is used to perform the additive manufacturing. For example, in the present aspect, the CNC machine can pick up and operate a cutting tool to cut the gate seal 320 as desired. The CNC machine can be a CNC mill, a CNC lathe, or any other suitable type of CNC machine.

Figure 4:
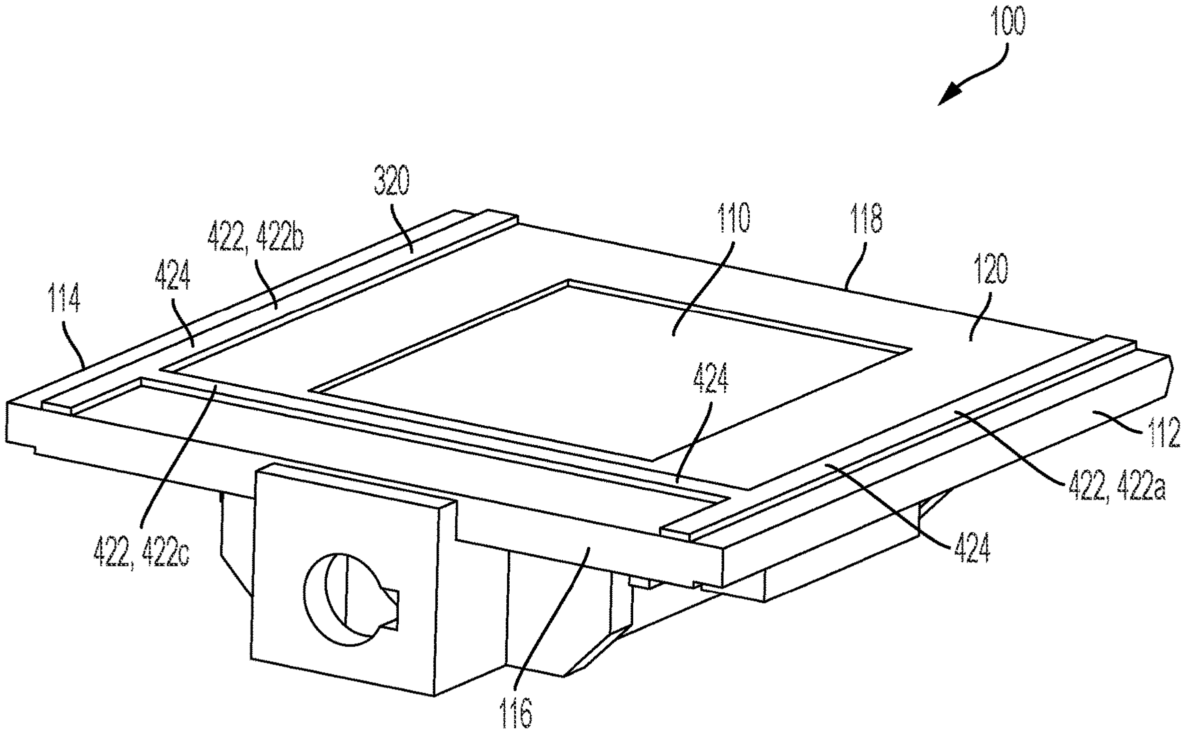
FIG. 4 is a top, rear perspective view of the slide gate of FIG. 1 further comprising the integral gate seal, in accordance with another aspect of the present disclosure.

FIG. 4 illustrates the slide gate 100 after the gate seal 320 has been precision-machined to the desired size and shape and the hybrid manufacturing process is completed. According to example aspects, the integral gate seal 320 can define a plurality of gate seal segments 422. The gate seal segments 422 can comprise a first gate seal segment 422*a* permanently attached to the first gate rough region 132 (shown in FIG. 1), a second gate seal segment 422*b* parallel to the first gate seal segment 422*a* and permanently attached to the second gate rough region 134 (shown in FIG. 1), and a lateral gate seal segment 422*c* extending between the first and second gate seal segments 422*a,b* and permanently attached to the lateral gate rough region 136 (shown in FIG. 1). The first gate seal segment 422*a* can be arranged proximate and substantially parallel to the first lateral side 112 of the gate body 110 and extends from the upper end 116 to the lower end 118. Similarly, the second gate seal segment 422*b* can be arranged proximate and substantially parallel to the second lateral side 114 of the gate body 110 and extends from the upper end 116 to the lower end 118. The lateral gate seal segment 422*c* can be arranged proximate and substantially parallel to the upper end 116 of the gate body 110. Thus, the gate seal 320 can substantially define an H-shape in the present aspect. In other aspects, the gate seal 320 can define any other suitable shape. Each of the gate seal segments 422 can define a gate seating face 424 distal to the gate body 110, as shown. The gate seating faces 424 can be configured to seal with corresponding frame seating faces 624 (shown in FIG. 6) of a frame seal 620 (shown in FIG. 6) of the gate frame 500 (shown in FIG. 5), as described in further detail below. The gate seating faces 424 can be substantially planar in the present aspect.

Figure 5:
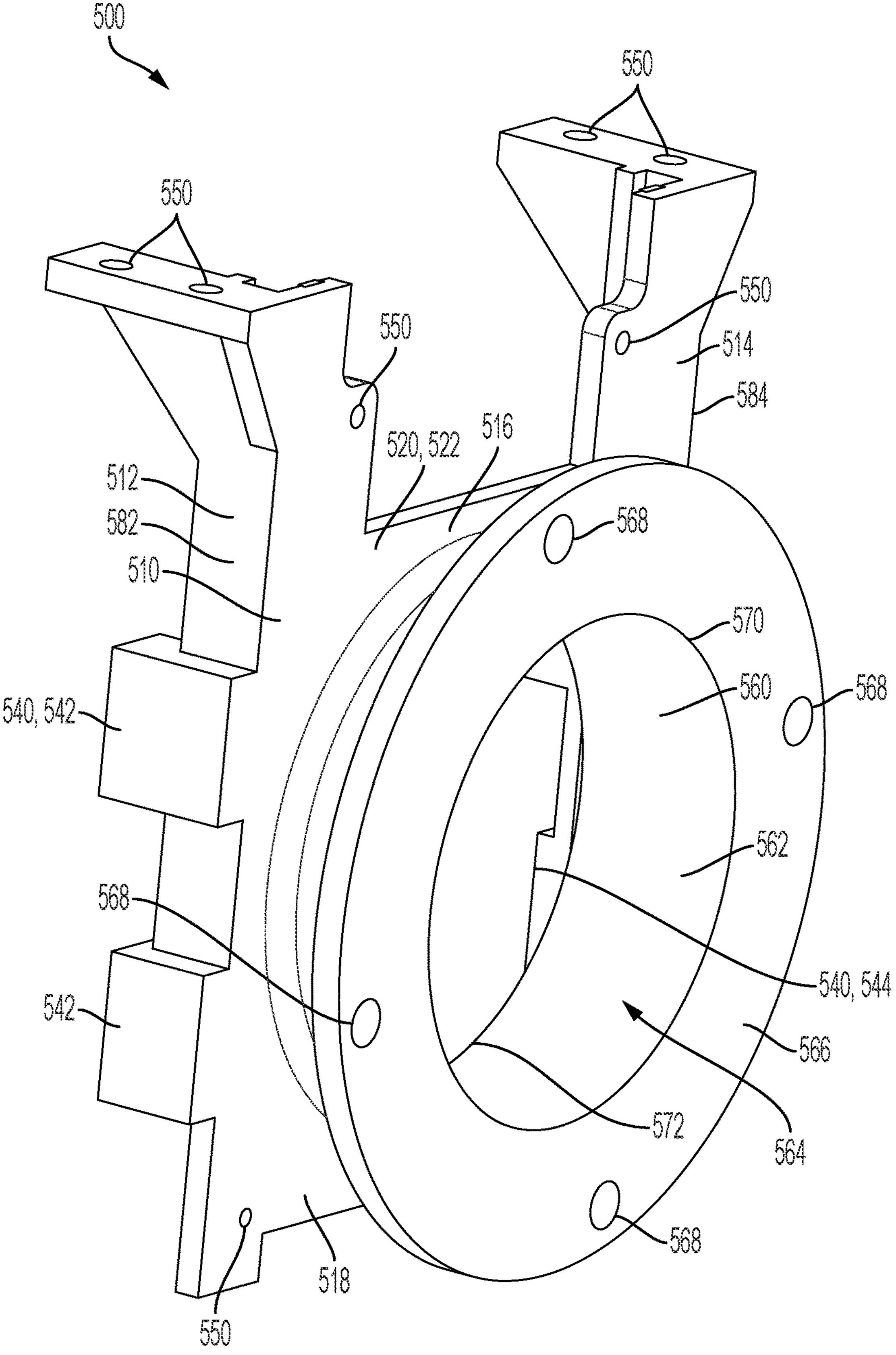
FIG. 5 is a front perspective view of a gate frame, in accordance with another aspect of the present disclosure.
Figure 6:
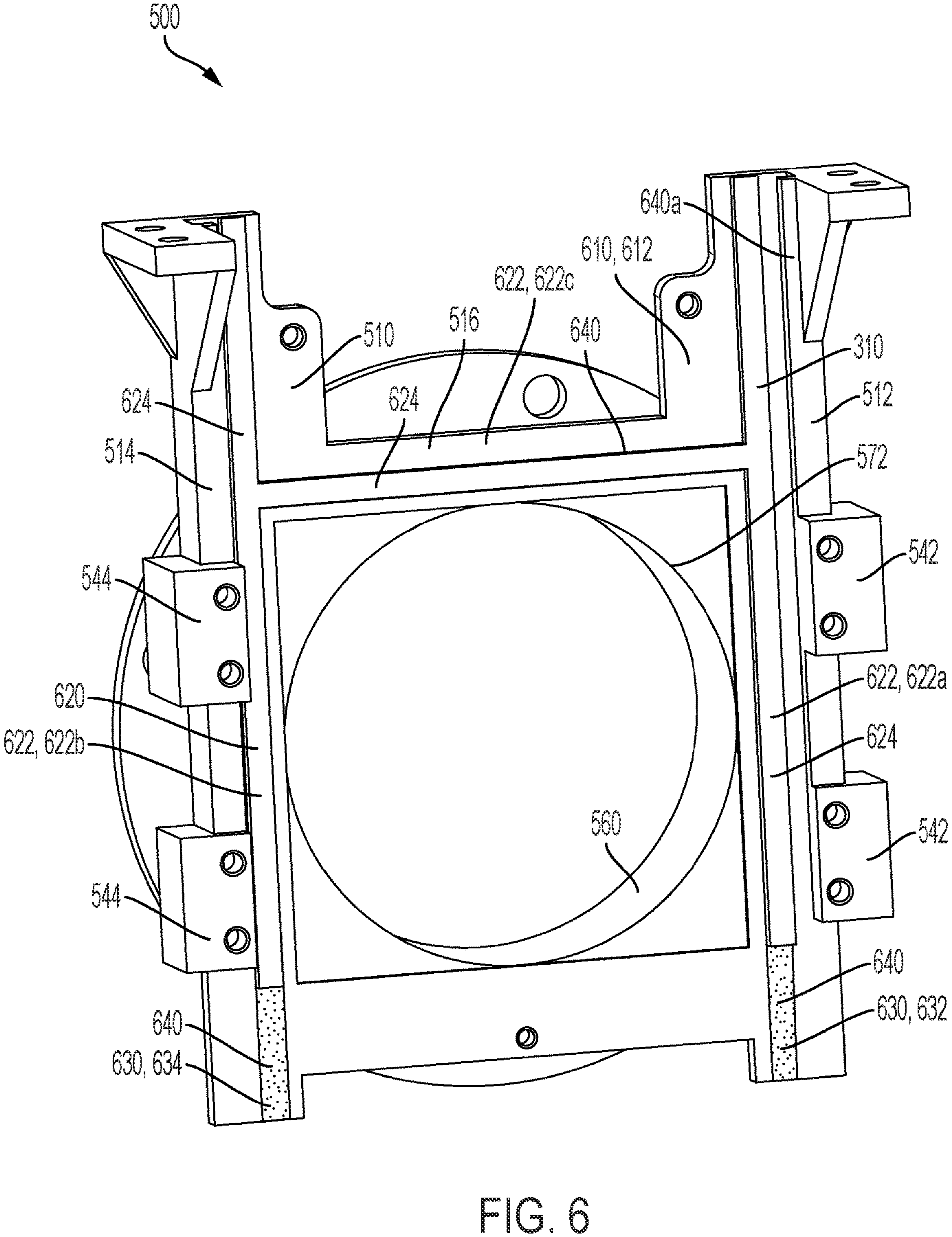
FIG. 6 is a rear perspective view of the gate frame of FIG. 5, wherein the gate frame comprises an integral frame seal.

FIGS. 5 and 6 illustrate front and rear perspective view of the gate frame 500, in accordance with an example aspect of the present disclosure. Example aspects of the gate frame 500 can be formed from a metal material, such as, for example, iron, and more specifically, cast iron. For example, the gate frame 500 may be cast from grey iron or ductile iron in some aspects. However, in other aspects, the gate frame 500 can comprise any other suitable material known in the art, including but not limited to, other metal materials, such as aluminum and steel, plastic materials, composite materials, and the like. Referring to FIG. 5, the gate frame 500 can comprise a substantially cylindrical frame body 560. The frame body 560 can define a substantially cylindrical body inner surface 562, which can define the frame opening 564. Fluid can be permitted to flow through the frame opening 564 when the slide gate 100 (shown in FIG. 1) is in the open orientation. In the closed orientation, the slide gate 100 can block the frame opening 564 to prohibit the flow of fluid therethrough. The frame opening 564 can be substantially cylindrical in the present aspect, but may define any other suitable shape in other aspects, such as square or rectangular. According to example aspects, a mounting flange 566 can extend radially outward from the frame body 560 at a first end 570 thereof. The mounting flange 566 can define on or more flange mounting holes 568 formed therethrough, as shown. Mounting fasteners can extend through each of the flange mounting holes 568 to couple the gate frame 500 to a desired structure, as described in further detail below with respect to FIG. 7.

Example aspects of the gate frame 500 can further comprise a frame support structure 510 formed at a second end 572 of the substantially cylindrical frame body 560. The frame support structure 510 can define a first frame face 610 (shown in FIG. 6), which can be an inward-facing frame face 612 (shown in FIG. 6), and a second frame face 520, which can be an outward-facing frame face 522. As shown, the frame support structure 510 can comprise a first side frame member 512 formed at a first lateral side 582 of the gate frame 500 and a second side frame member 514 formed at an opposite, second lateral side 584 of the gate frame 500. The gate frame 500 can further comprise an upper end frame member 516 and a lower end frame member 518. The upper end frame member 516 can extend between the first and second side frame members 512,514, and the lower end frame member 518 can extend between the first and second side frame members 512,514 opposite the upper end frame member 516. Each of the first and second side frame members 512,514 can be substantially vertically oriented, relative to the orientation shown, and each of the upper and lower end frame member 516,518 can be substantially horizontally oriented relative to the orientation shown. In example aspects, the frame support structure 510 can define one or more support mounting holes 550 formed therethrough. Additional mounting fasteners can extend through each of the support mounting holes 550 to further secure the gate frame 500 to the desired structure. The frame seal 620 (shown in FIG. 6) can extend along each of the first and second side frame members 512,514, and can further extend across the upper end frame member 516, as described in further detail below.

According to example aspects, the gate frame 500 can comprise one or more of the frame wedge blocks 540. For example, the frame wedge blocks 540 can comprise a pair of first frame wedge blocks 542 extending from the first side frame member 512 at the first lateral side 582 of the gate frame 500. The frame wedge blocks 540 can further comprise a pair of second frame wedge blocks 544 extending the second side frame member 514 at the second lateral side 584 of the gate frame 500. The first and second frame wedge blocks 542,544 can be configured to extend across the first and second lateral sides 112, 114 (shown in FIG. 1), respectively, of the slide gate 100 (shown in FIG. 1). Each of the first frame wedge blocks 542 and second frame wedge blocks 544 can be vertically spaced along the corresponding first side frame member 512 and second side frame member 514, respectively, as shown. Furthermore, a frame wedge can be mounted to each of the first and second frame wedge blocks 542,544. Each of the frame wedges can define one of the frame wedge faces, which can confront a corresponding one of the gate wedge faces, as described above. In some aspects, the first frame wedge blocks 542 and/or the second frame wedge blocks 544 can be cast monolithically with the gate frame 500, while in other aspects, the first and/or second frame wedge blocks 542,544 can be formed separately and attached thereto.

FIG. 6 illustrates a rear view of the gate frame 500, wherein the frame seal 620 is visible. The first frame face 610 can be substantially planar in the present aspect. According to example aspects, frame rough regions 630, like the gate rough regions 130 (shown in FIG. 1) formed on the slide gate 100 (shown in FIG. 1), can be formed on the first frame face 610 of the frame support structure 510 at target locations 640. For example, the frame rough regions 630 of the gate frame 500 can comprise first and second frame rough regions 632,634 like the first and second gate rough regions 132, 134 (shown in FIG. 1) of the slide gate 100 and a lateral frame rough region (not shown) like the lateral gate rough region 136 (shown in FIG. 1) of the slide gate 100. In example aspects, the frame rough regions 630 of the gate frame 500 can be formed by substantially the same process as the gate rough regions 130 of the slide gate 100, which is described in detail above. For example, the frame rough regions 630 of the gate frame 500 can be formed by scuffing, scratching, cutting, or otherwise roughing up the first frame face 610 at the target locations 640, for example, with a cutting tool utilized by a CNC machine. Other aspects of the gate frame 500 may not comprise the frame rough regions 630 formed on the first frame face 610. Furthermore, the frame seal 620 can be integrally formed with the gate frame 500 at the target locations 640 by substantially the same process that gate seal 320 (shown in FIG. 3B) is formed with the slide gate 100. That is, additive material 310, such as a bronze powder, can be deposited onto the frame support structure 510 of the gate frame 500 to form the integral frame seal 620 and then precision-machined to the desired shape and size by the same piece of equipment (i.e., by hybrid manufacturing). In the present aspect, the additive manufacturing process to deposit the additive material 310 on the gate frame 500 and the subtractive manufacturing process to precision-machine the integral frame seal 620 can both be performed by the same CNC machine that can form the corresponding frame rough regions 630 of the gate frame 500.

In the present aspect, the integral frame seal 620 can comprise a plurality of frame seal segments 622. For example, the frame seal segments 622 can comprise a first frame seal segment 622*a* extending substantially along a length of the first side frame member 512 and a second frame seal segment 622*b* extending substantially along a length of the second side frame member 514. The frame seal 620 can further comprise a lateral frame seal segment 622*c* extending across the upper end frame member 516 between the first and second frame seal segments 622*a,b*. Each of the frame seal segments 622 can be permanently attached to the first frame face 610 of the gate frame 500 by the additive manufacturing process. Furthermore, each of the frame seal segments 622 can define one of the frame seating faces 624 distal to the first frame face 610, as shown. The frame seating faces 624 can be configured to seal against the corresponding gate seating faces 424 (shown in FIG. 4) of the gate seal 320 of the slide gate 100, as described in further detail below.

Furthermore, according to example aspects, the frame support structure 510 can define a first guide rib 640*a* extending from the first side frame member 512 and a second guide rib 640*b* (shown in FIG. 7) extending from the second side frame member 514. A first guide slot 740*a* (shown in FIG. 7) can be defined between the first guide rib 640*a* and the first frame face 610, and a second guide slot 740*b* can be defined between the second guide rib 640*b* and the first frame face 610. The slide gate 100 (shown in FIG.

7) can be configured to slide within the first and second guide slots 740*a,b*, as shown in FIG. 7 below.

FIG. 7 illustrates the slide gate 100 assembled with the gate frame 500 to define a slide gate assembly 700, according to example aspect of the present disclosure. The slide gate assembly 700 can be secured to a structure within a channel or trench connected to a dam, water and sewage treatment plant, flood control project, power plant, fish hatchery, or the like. More specifically, in some aspects, the gate frame 500 of the slide gate assembly 700 can be configured to be mounted to a wall or a wall thimble. The mounting fasteners can extend through the flange mounting holes 568 and the support mounting holes 550 of the gate frame 500 and can engage the structure to mount the slide gate assembly 700 thereto. According to example aspects, the slide gate 100 can be slidably mounted on the gate frame 500 for movement between the closed configuration, as shown, and the open configuration. The first gate face 120 (shown in FIG. 1) of the slide gate 100 can face the first frame face 610 of the gate frame 500, and the first and second frame wedge blocks 542,544 can extend across the first and second lateral sides 112,114 of the slide gate 100 and beyond the second gate face 124. The slide gate 100 can be retained on the gate frame 500 by the slidable engagement of the first and second lateral sides 112, 114 thereof with the corresponding first and second guide slots 740*a,b*. The operating stem can extend through each of the upper stem opening 172, the upper rib stem opening 226, and the lower rib stem opening 292 of the slide gate 100 and drive the slide gate 100 upward and downward between the open and closed orientations, respectively.

Figure 8:
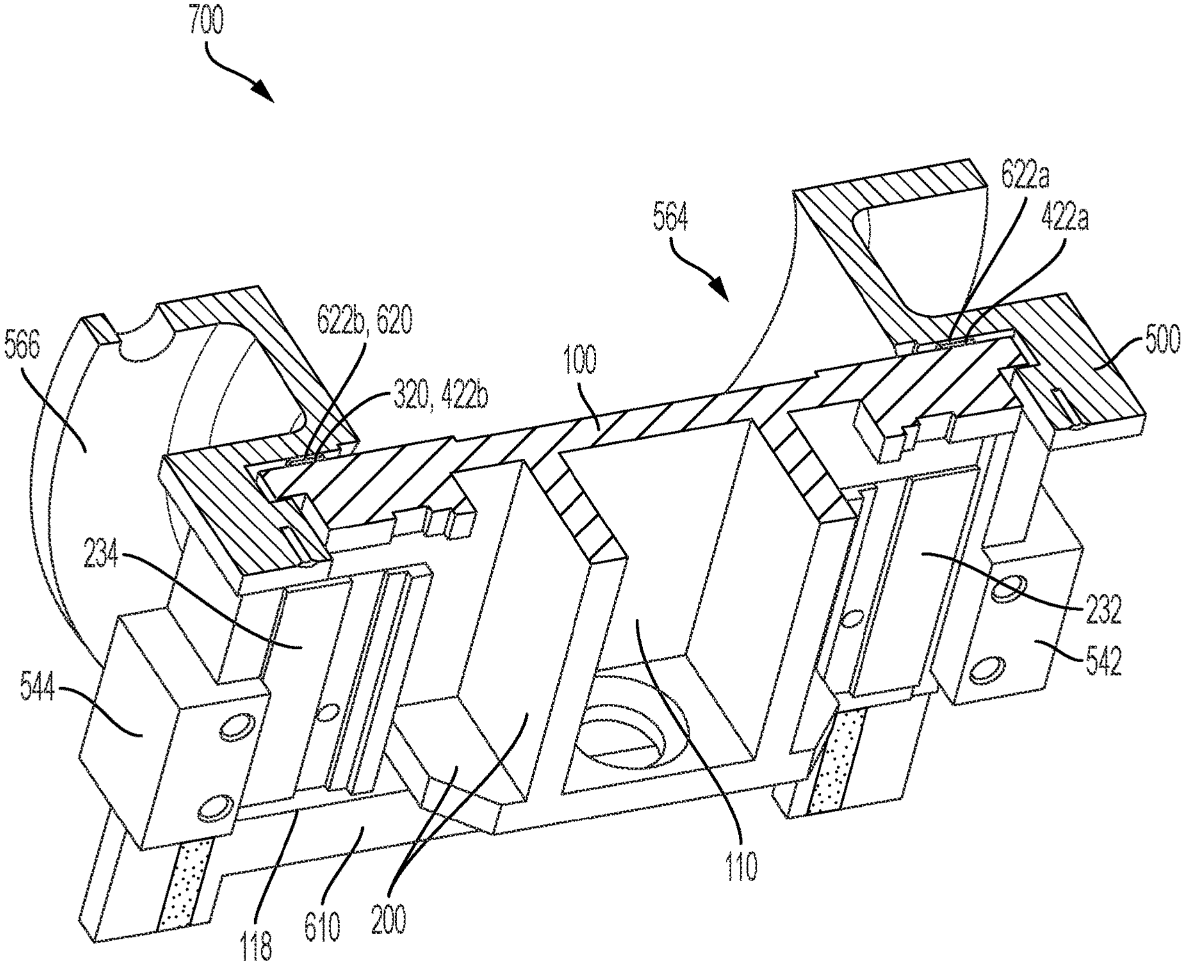
FIG. 8 is a cross-sectional view of the slide gate assembly of FIG. 7 taken along line 8-8 in FIG. 7.
Figure 9:
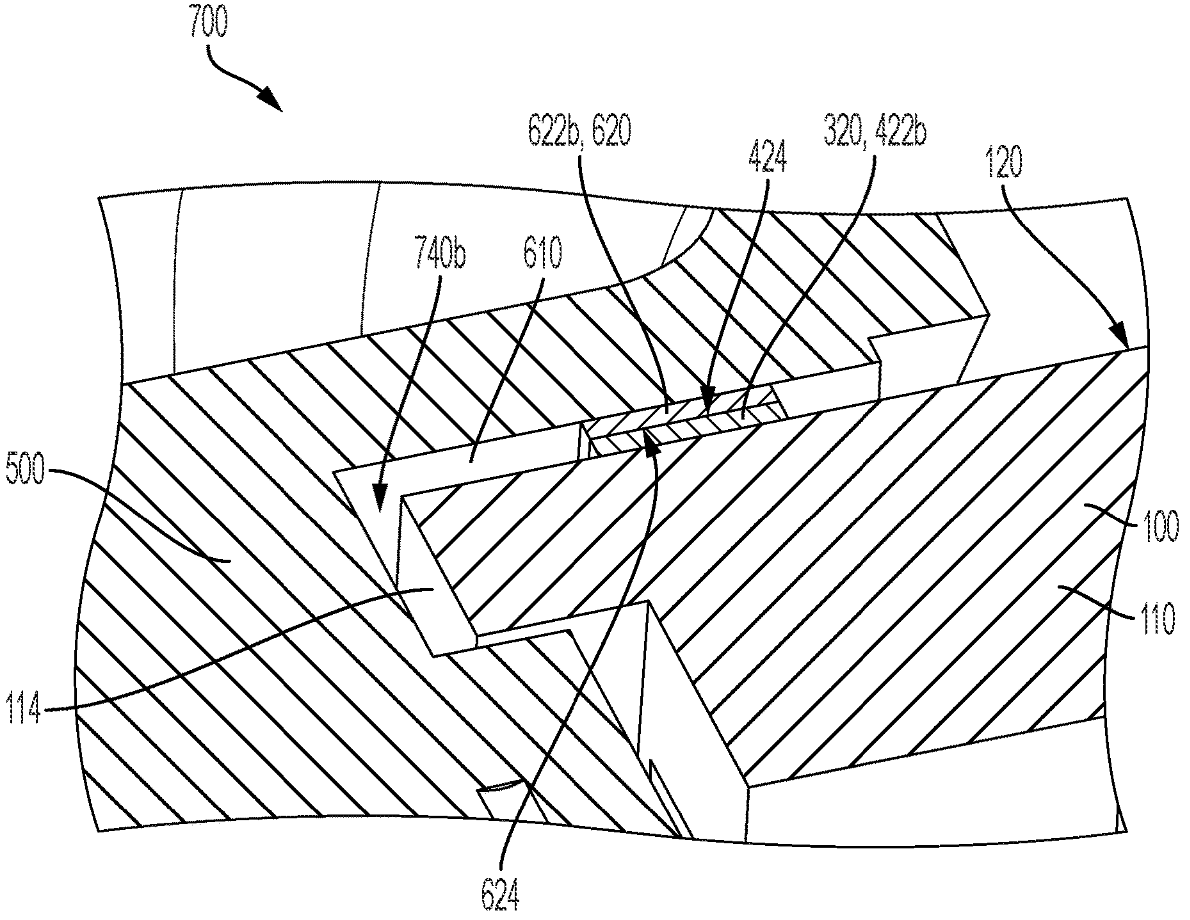
FIG. 9 is a detail cross-sectional view of the integral gate seal of FIG. 4 slidably engaged with the integral frame seal of FIG. 6.

Referring to the cross-sectional view of FIG. 8 and the detail cross-sectional view of FIG. 9, the gate seating faces 424 (best seen in FIG. 9) of the gate seal 320 can be configured to confront and seal with the frame seating faces 624 (best seen in FIG. 9) of the frame seal 620 in the closed orientation. Specifically, in the closed orientation, the first frame seal segment 622*a* can seal with the first gate seal segment 422*a*, the second frame seal segment 622*b* can seal with the second gate seal segment 422*b*, and the lateral frame seal segment 622*c* (shown in FIG. 6) can seal with the lateral gate seal segment 422*c* (shown in FIG. 4). The slide gate 100 can be lowered on the gate frame 500 in the closed orientation to block the frame opening 564 with the gate body 110 and restrict fluid from flowing therethrough. In example aspects, in the closed position, the frame wedges mounted to the first and second frame wedge blocks 542,544 can press against the gate wedges mounted to the first and second side wedge pads 232,234, respectively, which can bias the slide gate 100 towards the first frame face 610 of the gate frame 500. Biasing the slide gate 100 towards the first frame face 610 can press the gate seal 320 against the frame seal 620 to improve the seal therebetween. In some aspects, a lower seal can also be provided between the gate frame 500 and the slide gate 100 at or near the lower end 118 of the gate body 110 to create a substantially fluid-tight seal at the lower end 118. For example, the lower seal can be a bulb seal in some aspects. In other aspects, the lower seal can be any other suitable type of seal known in the art. Other example aspects of the slide gate assembly 700 can comprise additional seals, as desired, at any suitable location to further seal the slide gate 100 with the gate frame 500 in the closed orientation.

To allow fluid flow through the frame opening 564, the slide gate 100 can be slid upward relative to the gate frame 500 from the closed orientation shown to the open orientation. As the slide gate 100 moves to the open orientation, the gate seating faces 424 of the first and second gate seal segments 422*a,b* can slide along the frame seating faces 624 of the first and second frame seal segments 622*a,b*, respectively. The seal between the first gate seal segment 422*a* and first frame seal segment 622*a* and the seal between the second gate seal segment 422*b* and the second frame seal segment 622*b* can be maintained as the slide gate 100 slides upward. However, the lateral gate seal segment 422*c* can disengage the lateral frame seal segment 622*c* as the slide gate 100 moves to the open orientation. Additionally, any seal formed between the slide gate 100 and the gate frame 500 at the lower end 118 of the slide gate 100 (such as by the lower seal) can be unsealed in the open orientation. In the open orientation, fluid can flow through the frame opening 564 underneath the lower end 118 of the raised slide gate 100. According to example aspects, the slide gate 100 can be fully or partially raised in the open orientation to fully or partially unblock the frame opening 564, respectively.

FIG. 9 illustrates a detail cross-sectional view of slide gate assembly 700 showing the frame seating face 624 of the second frame seal segment 622*b* slidably seated against the gate seating face 424 of the second frame seal segment 622*b*. As described above, the sliding engagement between the gate seating faces 424 of the first and second gate seal segments 422*a,b* (first gate seal segment 422*a* shown in FIG. 4) and the frame seating faces 624 of the first and second frame seal segments 622*a,b*, (first frame seal segment 622*a* shown in FIG. 6) respectively, can enable the slide gate 100 to move between the closed orientation and the open orientation. Furthermore, as described above, the engagement of the gate seating faces 424 of the first and second gate seal segments 422*a,b* with the frame seating faces 624 of the first and second frame seal segments 622*a,b*, respectively, can seal the gate body 110 with the gate frame 500 adjacent to the first and second lateral sides 112, 114 (first lateral side 112 shown in FIG. 1) of the slide gate 100 in both the open and closed orientations. Moreover, according to example aspects, the gate seating face 424 of the lateral gate seal segment 422*c* (shown in FIG. 4) can engage the frame seating face 624 of the lateral frame seal segment 622*c* (shown in FIG. 6) to further seal the gate body 110 with the gate frame 500 in the closed orientation.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A slide gate assembly comprising:

a gate frame defining a frame opening, a frame support structure, and an integral frame seal integrally formed with the frame support structure, the integral frame seal defining a frame seating face; and a slide gate slidably mounted on the gate frame, the slide gate comprising a gate body and an integral gate seal integrally formed with the gate body, the integral gate seal defining a gate seating face, the gate seating face sealed with and slidable along the frame seating face;

wherein:

the slide gate is movable between an open orientation, wherein fluid is permitted to flow through the frame opening, and a closed orientation, wherein fluid is restricted from flowing through the frame opening;

the integral gate seal comprises a first gate seal segment and a second gate seal segment parallel to the first gate seal segment;

the integral frame seal comprises a first frame seal segment and a second frame seal segment parallel to the first frame seal segment;

the first frame seal segment is configured to seal with and slides along the first gate seal segment;

the second frame seal segment is configured to seal with and slides along the second gate seal segment;

the integral gate seal further comprises a lateral gate seal segment extending between the first gate seal segment and the second gate seal segment;

the integral frame seal further comprises a lateral frame seal segment extending between the first frame seal segment and the second frame seal segment;

the lateral frame seal segment is configured to seal with the lateral gate seal segment in the closed orientation; and the lateral frame seal segment is configured to disengage the lateral gate seal segment in the open orientation.

2. The slide gate assembly of claim 1, wherein:

the first gate seal segment is arranged proximate to a first lateral side of the gate body, the second gate seal segment arranged proximate to a second lateral side of the gate body, and the lateral gate seal segment is arranged proximate to an upper end of the gate body;

the frame support structure comprises a first side frame member, a second side frame member, and an upper end frame member extending between the first side frame member and the second side frame member; and the first frame seal segment is arranged on the first side frame member proximate to a first lateral side of the gate frame, the second frame seal segment arranged on the second side frame member proximate to a second lateral side of the gate frame, and the lateral frame seal segment is arranged on the upper end frame member.

3. The slide gate assembly of claim 1, wherein:

the gate body defines a first gate rough region and a second gate rough region;

the first gate seal segment is integrally formed with the gate body at the first gate rough region and the second gate seal segment is integrally formed with the gate body at the second gate rough region;

the frame support structure defines a first frame rough region and a second frame rough region; and the first frame seal segment is integrally formed with the frame support structure at the first frame rough region and the second frame seal segment is integrally formed with the frame support structure at the second frame rough region.

4. The slide gate of claim 3, wherein:

the gate body further defines a lateral gate rough region extending between the first gate rough region and the second gate rough region;

the lateral gate seal segment is integrally formed with the gate body at the lateral gate rough region;

the frame support structure further defines a lateral frame rough region extending between the first frame rough region and the second frame rough region; and the lateral frame seal segment is integrally formed with the frame support structure at the lateral frame rough region.

5. The slide gate assembly of claim 1, wherein:

the gate body defines a first gate face and a second gate face;

the integral gate seal comprises an additive material additively deposited on the first gate face;

the frame support structure defines a first frame face and a second frame face; and the integral frame seal comprises an additive material additively deposited on the first frame face.

6. The slide gate assembly of claim 5, wherein the additive material of the integral gate seal comprises a metal powder and wherein the additive material of the integral frame seal comprises a metal powder.

7. A slide gate assembly, comprising:

a gate frame comprising:

a frame opening;

a frame support structure; and a frame seal integrally formed with the frame support structure and defining a frame seating face; and a slide gate mounted on the gate frame and slidable between an open orientation and a closed orientation, the slide gate comprising:

a gate body; and a gate seal integrally formed with the gate body, the gate seal defining a gate seating face slidably sealed with the frame seating face;

wherein:

the gate seal comprises a first gate seal segment and a second gate seal segment parallel to the first gate seal segment;

the frame seal comprises a first frame seal segment and a second frame seal segment parallel to the first frame seal segment;

the first frame seal segment is configured to seal with and slides along the first gate seal segment;

the second frame seal segment is configured to seal with and slides along the second gate seal segment;

the gate seal comprises a lateral gate seal segment extending between the first gate seal segment and the second gate seal segment;

the frame seal comprises a lateral frame seal segment extending between the first frame seal segment and the second frame seal segment;

the lateral frame seal segment is configured to seal with the lateral gate seal segment in the closed orientation; and the lateral frame seal segment is configured to disengage the lateral gate seal segment in the open orientation.

8. The slide gate assembly of claim 7, wherein:

the first gate seal segment is arranged proximate to a first lateral side of the gate body, the second gate seal segment arranged proximate to a second lateral side of the gate body, and the lateral gate seal segment is arranged proximate to an upper end of the gate body;

the frame support structure comprises a first side frame member, a second side frame member, and an upper end frame member extending between the first side frame member and the second side frame member; and the first frame seal segment is arranged on the first side frame member proximate to a first lateral side of the gate frame, the second frame seal segment arranged on the second side frame member proximate to a second lateral side of the gate frame, and the lateral frame seal segment is arranged on the upper end frame member.

9. The slide gate assembly of claim 7, wherein:

the gate body defines a first gate rough region and a second gate rough region;

the first gate seal segment is integrally formed with the gate body at the first gate rough region, and the second gate seal segment is integrally formed with the gate body at the second gate rough region;

the frame support structure defines a first frame rough region and a second frame rough region; and the first frame seal segment is integrally formed with the frame support structure at the first frame rough region, and the second frame seal segment is integrally formed with the frame support structure at the second frame rough region.

10. The slide gate of claim 9, wherein:

the gate body further defines a lateral gate rough region extending between the first gate rough region and the second gate rough region;

the lateral gate seal segment is integrally formed with the gate body at the lateral gate rough region; and the lateral frame seal segment is integrally formed with the frame support structure at the lateral frame rough region.

11. The slide gate assembly of claim 7, wherein:

the gate body defines a first gate face and a second gate face;

the gate seal comprises an additive material additively deposited on the first gate face;

the frame support structure defines a first frame face and a second frame face; and the frame seal comprises an additive material additively deposited on the first frame face.

12. The slide gate assembly of claim 11, wherein the additive material of the gate seal comprises a metal powder and wherein the additive material of the frame seal comprises a metal powder.

* * * * *